United States Patent Office 3,446,604
Patented May 27, 1969

3,446,604
ACID AND SALTS OF $B_{20}H_{18}^{-2}$ ION
Earl L. Muetterties, West Chester, Pa., assignor to E. I. du Pont de Nemours and Company, Wilmington, Del., a corporation of Delaware
No Drawing. Continuation-in-part of application Ser. No. 199,571, May 31, 1962. This application Oct. 9, 1963, Ser. No. 315,084
Int. Cl. C01b 6/08, 6/22
U.S. Cl. 23—358          16 Claims

ABSTRACT OF THE DISCLOSURE

The acid $H_4B_{20}H_{18}$ and salts thereof can be prepared by oxidizing a decahydrodecaborate (2−) compound, and reducing the product. Cations can be exchanged by metathetical reaction. A hydroxyl group, a hydrocarbyloxy group or an amino group can be introduced by reacting $B_{20}H_{18}^{-2}$ anions with the appropriate base prior to reduction. The compounds have many uses such as the manufacture of resistive elements or can be used in the manufacture of fireworks.

DESCRIPTION OF THE INVENTION

This invention relates to new compounds containing boron and to methods for preparing the compounds.

This application is a continuation-in-part of my copending application, U.S. Ser. No. 199,571, filed May 31, 1962, now abandoned.

Boron compounds, principally salts of boric acid, have been in commercial use for many years. Recently other boron compounds, e.g., low molecular weight boron hydrides, have achieved technical importance in applications employing oxidizing and reducing agents. There are many potential applications, however, for which the available boron compounds are unsuited because of hydrolytic, oxidative or other types of instability. To illustrate, diborane, chlorodiborane, pentaborane(9) and trialkylboron compounds are spontaneously flammable in air. Diborane, pentaborane(9), chlorodiborane, boron trichloride, iododecaborane(14), and most other boron halides are hydrolyzed rapidly in water or alcohol. Even the most stable known borohydride, i.e., decaborane(14), is hydrolyzed at a moderate rate in water. Known ionic borohydrides, e.g., tetrahydroborates ($NaBH_4$, and the like), are hydrolyzed at a rapid rate at 100° C.

A class of boron compounds has now been obtained which show good hydrolytic and oxidative stability.

The novel compounds of the invention are the acid, $H_4B_{20}H_{18}$, salts of the acid and derivatives of either wherein one of the hydrogens bonded to boron in the $B_{20}H_{18}^{-4}$ anion is replaced by a substituent which can be hydroxyl (—OH), hydrocarbyloxy (—OR, where R is preferably an aliphatically saturated hydrocarbyl group), or amino (—$NH_2$).

The acid, $H_4B_{20}H_{18}$, and the acids of its substituted derivatives are tetrabasic acids in which the ionization constants for three of the acidic hydrogens are high and are in the class of strong mineral acids; while the ionization constant of the fourth hydrogen is low and approaches the value for organic acids. Because the ionization constant of the fourth acidic hydrogen is low, the formula $H_4B_{20}H_{18}$ may be written as $H_3(H^+B_{20}H_{18}^{-4})$ or alternatively as $H_3(HB_{20}H_{18})^{-3}$ or more simply $$H_3(B_{20}H_{19})^{-3}$$

All of these alternative formulas denote the compound of the invention having the formula $H_4B_{20}H_{18}$, and it will be understood that said formula $H_4B_{20}H_{18}$ used herein is so defined.

Thus it is seen that when all four acidic hydrogens of $H_4B_{20}H_{18}$ are replaced by cations, neutral salts are formed. This usually occurs in the presence of a strong base. On the other hand, when a weak base is used, only the three strongly acidic hydrogens are replaced and the salt formed is an acid salt wherein the acid anion has the formula $(H^+B_{20}H_{18}^{-4})^{-3}$ or alternatively and more simply, $B_{20}H_{19}^{-3}$. Thus, salts of the acid anion can be viewed as salts of a tribasic anion or as acid salts of a tetrabasic anion.

Both neutral and acid salts of $H_4B_{20}H_{18}$ and the substitution products based thereon as defined earlier are included within the scope of this invention.

The novel products of the invention may be further defined as compounds of the formula $$M_a(B_{20}H_{18-n}X_n)_b \qquad (1)$$

and hydrates thereof, where M is a cation, i.e., an atom or group of atoms which, in aqueous solution, can form one or more positively charged ions having a valence of 1 or more; X is —OH, —OR (where R is a monovalent hydrocarbyl group or radical), or —$NH_2$; n is a cardinal number of up to 1, i.e., 0–1, inclusive; a and b are the smallest whole numbers which satisfy the equation:

$$b = \frac{ax \text{ valence of M}}{4} \qquad (2)$$

The divisor, i.e., 4, represents the valence of the anion.

Acids of the anion of Formula 1 are represented generically by the formula $H_4B_{20}H_{18-n}X_n$, wherein, as described earlier, three of the ionizable hydrogens are strongly acidic and the fourth is weakly acidic. Alternatively, acids of the anions of Formula 1 may be represented as $H_3(H^+B_{20}H_{18-n}X_n^{-4})$, $H_3(HB_{20}H_{18-n}X_n)$ or more simply as $H_3B_{20}H_{19-n}X_n$). Again, it will be understood that the formula $H_4B_{20}H_{18-n}X_n$) includes the alternatives in the previous sentence.

Salts of the acid anion, i.e., salts of $(HB_{20}H_{18-n}X_n)^3$ or more simply $(B_{20}H_{19-n}X_n)^{-3}$, fall within the scope of Formula 1 and they can be represented as a subgeneric group by the formula:

$$M_{a'}(HB_{20}H_{18-n}X_n)_{b'} \qquad (1a)$$

which can also be written conveniently as $$M_{a'}(B_{20}H_{19-n}X_n)_{b'} \qquad (1b)$$

where M, X and n are defined as in Formula 1, and a' and b' are defined as the smallest whole numbers which satisfy the equation:

$$b' = \frac{a'x \text{ valence of M}}{3} \qquad (2a)$$

The divisor, i.e., 3, represents the valence of the acid anion ($HB_{20}H_{18-n}X_n$ or $B_{20}H_{19-n}X_n$).

In an especially preferred form of the invention the group X in the above formulas is —OH or —OR, where R is an aliphatically saturated hydrocarbyl group of up to 12 carbons (i.e., R is free of olefinic and acetylenic bonds; in other words, free of aliphatic unsaturation, but can contain aromatic unsaturation); and n is a cardinal number of up to 1, i.e., 0–1, inclusive. R, it is seen, covers alkyl, cycloalkyl, aryl, and aralkyl groups.

Compounds of Formulas 1 and 1a which are free of X groups ($n=0$) form an important subgeneric group which is represented by the following formula:

$$M_a(B_{20}H_{18})_b \qquad (3)$$

where M, a and b are defined as in Formula 1. Alternatively, a and b can be defined as the smallest whole numbers which satisfy the equation:

$$4b = ax \text{ valence of M} \qquad (4)$$

The compounds of Formula 3, of course, include acid salts of the $B_{20}H_{18}^{-4}$ anion as described for the compounds of generic Formula 1. The acid salts of the unsubstituted anion can be viewed, as described earlier, as salts of $(HB_{20}H_{18})^{-3}$ or $(B_{20}H_{19})^{-3}$. This subgeneric group of compounds is represented by the formula:

$$M_{a'}(HB_{20}H_{18})_{b'} \quad (3a) \text{ or } M_{a'}(B_{20}H_{19})_{b'} \quad (3b)$$

where M is defined as in Formula 1 and $a'$ and $b'$ are defined as in Formula 2a. Alternatively, $a'$ and $b'$ can be defined as the smallest whole numbers which satisfy the equation:

$$3b' = a'x \text{ valence of M} \quad (4a)$$

The compounds of the invention are obtained by oxidation or reduction processes or by combinations of these processes. Unsubstituted compounds of Formulas 3a and 3b are obtained by oxidation decahydrodecaborates-(2−) (salts of the $B_{10}H_{10}^{-2}$ anion) or by reduction of octadecahydroeicosaborates-(2−) (salt of the $B_{20}H_{18}^{-2}$ anion). Compounds bearing X substituents are obtained by reaction of octadecahydroeicosaborates-(2−) with strong inorganic bases (NaOH, NaNH$_2$, etc.) or with metal salts of alcohols or phenols (Na ethoxide, K phenoxide, etc.). Methods of preparation will be described fully in later paragraphs.

The compounds of the invention are composed of two principal components which are represented by M and by the polyborate anion which in generic Formula 1 is $(B_{20}H_{18-n}X_n)^{-4}$. The component M and the polyborate anion, in its generic and subgeneric forms, will be discussed separately in the following paragraphs.

THE GROUP M

The group represented by M is a cation which can be composed of one or more than one element and which is ionically bonded to the boron-containing group. The group represented by M bear one or more positive ionic charges and they have in common the property of forming positively charged groups or cations in water. The sole function of the group M is to provide a component with the necessary positive charges which will combine with the negatively charged (or ionic) boron-containing group in generic Formula 1 and thus permit isolation of the novel anion in the form of a compound. The properties of the group M are not critical and the group, therefore, represents a broad range of elements or combinations of elements. To illustrate, M can be hydrogen, which in aqueous solution forms a hydronium ion ($H_3O^+$), a metal, ammonium ($NH_4^+$), hydrazonium ($NH_2NH_3^+$) (also called hydrazinium), N-substituted ammonium, N-substituted hydrazinium, aryldiazonium ($ArN_2^+$), sulfonium, phosphonium, metal-ammine, and the like.

The group M can be derived from any metal. The metals according to the Periodic Table in Deming's "General Chemistry," 5th ed., chap. II, John Wiley & Sons Inc., and in Lange's "Handbook of Chemistry," 9th ed., pp. 56–57, Handbook Publishers, Inc. (1956) are the elements of Groups I, II, VIII, III–B, IV–B, V–B, VI–B, VII–B, and the elements of Groups III–A, IV–A, V–A, and VI–A which have atomic numbers above 5, 14, 33, and 52, respectively. The metals can be light or heavy metals. To illustrate, M can be lithium, sodium, potassium, cesium, beryllium, barium, lanthanum, manganese, iron, cobalt, copper, zinc, mercury, aluminum, thallium, tin, lead, silver, or any other metal. Preferred metals are those whose valences are 1–3, inclusive.

An especially preferred group of metals from which M can be derived consists of elements of Groups I-A, II-A, I-B and II-B having atomic numbers up to and including 80. Most preferred metals are the alkali and alkaline earth metals, i.e., lithium, sodium, potassium, rubidium, cesium, beryllium, magnesium, calcium, strontium, and barium.

The group M can be a combination of a metal and ammonia or a metal and an amine, i.e., a Werner-type coordination complex referred to as a metal-ammine group. To illustrate, M can be $[Ni(NH_3)_6]^{+2}$, $[Zn(NH_3)_4]^{+2}$, $[Co(NH_2C_2H_4NH_2)_3]^{+3}$, $[Ni(pyridyl)_6]^{+2}$, $[Co(NH_3)_6]^{+3}$, $[Cu(NH_3)_4]^{+2}$, and the like. The group can be a metal with water of hydration, e.g., $[Cu(H_2O_6)]^{+2}$, $[Ni(H_2O)_6]^{+2}$, and the like.

The group M can be an N-substituted ammonium radical, an S-substituted sulfonium group and a P-substituted phosphonium group, having the formulas $R'NH_3^+$, $R'_2NH_2^+$, $R'_3NH^+$, $R'_4N^+$, $R'_3S^+$, and $R'_4P^+$. $R'$ represents an organic group bonded to the nitrogen, sulfur or phosphorus. The $R'$ groups are not critical features of these cation groups; thus, $R'$ can be an open-chain, closed-chain, saturated or unsaturated hydrocarbon or substituted hydrocarbon group. $R'$ can be an aliphatic, cycloaliphatic, aromatic or heterocyclic ring of which the nitrogen, sulfur or phosphorus atom is a component part. Thus, when M is a substituted ammonium group, $R'$ can be derived from pyridine, quinoline, morpholine, hexamethyleneimine, and the like. Preferably $R'$, for reasons of availability of reactants, contains at most 18 carbon atoms. For example, $R'$ can be alkyl, alkenyl, cycloalkyl, cycloalkenyl, aryl, aralkyl, alkaryl, and the like. To illustrate specifically, $R'$ can be methyl, 2-ethylhexyl, octadecyl, allyl, cyclohexyl, cyclohexenyl, phenyl, napthyl, anthryl, cyclohexylphenyl, tolyl, xylyl, diphenylyl, benzyl, chloroethyl, ω-cyanoamyl, β-hydroxyethyl, p-hydroxyphenyl, and the like.

The group M can be an N-substituted hydrazonium (also called hydrazinium) radical having the formula $(R'NHNH_3)^+$, $(R'_2NNH_3)^+$, and the like, wherein $R'$ has the same definition as given in the preceding paragraph. To illustrate, the hydrazonium cation can be derived from phenylhydrazine, methylhydrazine, 1,1-dimethylhydrazine, 1,2-dimethylhydrazine, ethylhydrazine, 1,1-diethylhydrazine, and similar compounds.

The group M can yield one cation or more than one cation in aqueous solution, i.e., M can be a combination of cation-forming components. To illustrate, M can be composed of cations derived from sodium and potassium, cesium and ammonium, trimethylsulfonium and hydrogen, tetramethylammonium, ammonium and hydrogen (hydronium), and the like. For mixed cations in which one of the cations is hydrogen, the compound is viewed, as described earlier, as a salt of the acid anion of Formula 3.

The cations "hydrogen" and "hydronium" are used herein as described on page 26 of "Nomenclature of Inorganic Chemistry—International Union of Pure and Applied Chemistry," published by Butterworth's Scientific Publications (1957).

The valence of the cation M will be between 1 and 4, i.e., M can have a valence of 1, 2, 3, or 4. In most cases the valence of M will be 1, 2, or 3. The group of compounds in which the valence of M is at most 3, are readily preparable and so form a preferred group of compounds of this invention.

THE GROUP $(B_{20}H_{18-n}X_n)^{-4}$

The novel and characterizing feature of the compounds of the invention is the polyhydropolyborate group $(B_{20}H_{18-n}X_n)^{-4}$. The group is represented generically as having a negative ionic charge of 4 and in the presence of a strong base it behaves as a tetravalent anion. In the presence of a weak base or in neutral solution the anion is associated with a weakly acidic ionizable hydrogen to form an acid anion which can be viewed as having the formula $[H^+(B_{20}H_{18-n}X_n)^{-4}]$ and is written simply as $(B_{20}H_{19-n}X_n)^{-3}$.

The anionic group can be unsubstituted or it can bear one substituent designated as X. The substituent can be, as defined earlier, —OH, —NH$_2$, or —OR. The substituent is bonded to a boron atom of the $B_{20}$ unit and replaces a hydrogen atom bonded previously to the boron.

The anionic group, whether substituted or unsubstituted, or in neutral or acidic form, is exceptionally stable. The group is not easily decomposed by hydrolysis, oxidation or reduction and it is resistant to thermal decomposition. The group is unchanged in simple metathetic reactions, a property which permits the preparation of a broad range of neutral and acidic salts in which the cation is represented by M.

CHARACTERISTICS OF THE COMPOUNDS

The compounds are generally crystalline solids with the high-melting points which are characteristic of salts. They are stable under conventional storage conditions and can be kept for prolonged periods without decomposition.

The compounds of the neutral and acid anions, $B_{20}H_{18}^{-4}$ and $(H^+B_{20}H_{18}^{-4})^{-3}$ or $B_{20}H_{19}^{-3}$, and their substituted derivatives, in which the cation M contributes no color are usually white or colorless. The salts are appreciably soluble in water and hydroxylated solvents. In view of this property, the salts are readily separated from the less soluble salts of the divalent anion $B_{20}H_{18}^{-2}$ or its substituted derivatives, which may be present. The compounds of the invention are insoluble in oxygenated organic solvents such as acetone, ether, dimethylformamide, and the like.

Compounds of the unsubstituted tetravalent anion, i.e., $B_{20}H_{18}^{-4}$, show characteristic and identifying absorption bands in the infrared spectrum at approximately the following wavelengths (expressed as microns): 4.1, very strong; 9.0, medium; 9.8, strong; and 12.6, very weak. Shifts in the characteristic bands can occur in view of the possible effect of the cation in the compounds.

Compounds of the unsubstituted acid anion show characteristic and identifying absorption bands in the infrared absorption spectrum at approximately the following wavelengths (expressed as microns): 4.0, strong; 5.4, medium; and 10.0, strong.

The properties of the acid salts, i.e., compounds of Formulas 1a and 3a, resemble closely the properties of the neutral salts. Salts of the acid anion ($HB_{20}H_{18}^{-3}$ or $B_{20}H_{19}^{-3}$) can be isolated readily in anhydrous form, i.e., free of solvent of crystallization. Salts of the neutral tetravalent anion ($B_{20}H_{18}^{-4}$) are isolated most conveniently with solvent of crystallization. The salts of the acid anion may, therefore, be employed with advantage in fields where the presence of water or hydroxylated solvents is undesirable.

The acids of the anions of Formula 1 are readily soluble in water and their aqueous solutions are stable. The acids are conveniently handled in aqueous solutions and these solutions form a part of this invention. In the case of the acid derived from the anion bearing an —$NH_2$ substituent, one of the acidic protons can be associated firmly with the —$NH_2$ group, e.g., the acid derived from $(B_{20}H_{17}NH_2)^{-4}$ may behave in aqueous solution in the presence of a weak base as an acid having the anion $(B_{20}H_{17} \cdot NH_3)^{-3}$.

The following examples illustrate unsubstituted compounds of the invention:

$Li_4B_{20}H_{18}$
$K_4B_{20}H_{18}$
$Mg_2B_{20}H_{18}$
$Cs_4B_{20}H_{18}$
$Sr_2B_{20}H_{18}$
$Ba_2B_{20}H_{18}$
$Ag_4B_{20}H_{18}$
$[Mn(H_3O)_6]_2B_{20}H_{18}$
$[Fe(H_2O)_6]_2(B_{20}H_{18})$
$[Co(H_2O)_6]_2(B_{20}H_{18})$
$[Ni(H_2O)_6]_2(B_{20}H_{18})$
$Hg_2B_{20}H_{18}$
$Pb_2B_{20}H_{18}$
$(NH_2NH_3)_4B_{20}H_{18}$
$[(CH_3)_2NNH_3]_4B_{20}H_{18}$
$(C_6H_5NHNH_3)_4B_{20}H_{18}$
$(NH_4)_4B_{20}H_{18}$
$(CH_3NH_3)_4B_{20}H_{18}$
$(C_6H_5NH_3)_4B_{20}H_{18}$
$[(C_6H_{11})_2NH_2]_4B_{20}H_{18}$
$(C_3H_7NH_3)_4B_{20}H_{18}$
$(C_{18}H_{35}NH_3)_4B_{20}H_{18}$
$(NH_3CH_2CH_2NH_3)_2B_{20}H_{18}$
$[CN(CH_2)_5NH_3]_4B_{20}H_{18}$
$(CH_3CH_2OCH_2CH_2NH_3)_4B_{20}H_{18}$
$(CH_2CH_2OCH_2CH_2NH_2)_4B_{20}H_{18}$
$(C_5H_5NH)_4B_{20}H_{18}$
$[(C_5H_4N)_2H]_4B_{20}H_{18}$
$[(CH_3)_3S]_4B_{20}H_{18}$
$[(C_4H_9)_3S]_4B_{20}H_{18}$
$[(CH_3)_4P]_4B_{20}H_{18}$
$[(C_4H_9)_4P]_4B_{20}H_{18}$
$[Zn(NH_3)_4]_2B_{20}H_{18}$
$[Co(NH_3)_6]_2B_{20}H_{18}$, and the like. Representative salts of the acid anion are $Na_3B_{20}H_{19}$, $Ca_3(B_{20}H_{19})_2$ [written also as $Ca_3(HB_{20}H_{18})_2$]

$(NH_4)_3B_{20}H_{19}$
$Eu(H_2O)_6B_{20}H_{19}$
$(C_2H_5NH_3)_3B_{20}H_{19}$
$(C_5H_5NH)_3B_{20}H_{19}$
$(NH_3CH_2CH_2NH_3)_3(B_{20}H_{19})_2$
$Al(H_2O)_6B_{20}H_{19}$
$Na_2CsB_{20}H_{19}$
$Co(NH_3)_6B_{20}H_{19}$
$(HOCH_2CH_2NH_3)_3B_{20}H_{19}$, and the like.

Compounds bearing hydroxyl substituents are represented generically by the formulas $M_a(B_{20}H_{17}OH)_b$ (5) or $M_{a'}(B_{20}H_{18}OH)_{b'}$ (5a) where M, $a$, $b$, $a'$ and $b'$ are defined as in formulas (1) and (1a). Representative examples of hydroxyl-substituted compounds are as follows:

$Na_4B_{20}H_{17}OH$
$K_4B_{20}H_{17}OH$
$Cs_4B_{20}H_{17}OH$
$(NH_4)_4B_{20}H_{17}OH$
$(iso-C_3H_7NH_3)_4B_{20}H_{17}OH$
$[(C_2H_5)_4N]_4B_{20}H_{17}OH$
$(quinolinium)_4B_{20}H_{17}OH$
$[(C_2H_5)_3S]_4B_{20}H_{17}OH$
$[(CH_3)_3PCH_2CH_2P(CH_3)_3]_2B_{20}H_{17}OH$
$Mg_2B_{20}H_{17}OH$
$[Co(H_2O)_6]_4(B_{20}H_{17}OH)_3$
$Li_3B_{20}H_{18}OH$
$Ca_3(B_{20}H_{18}OH)_2$
$Ba_3(B_{20}H_{18}OH)_2$
$Hg_3(B_{20}H_{18}OH)_2$
$(NH_4)_3B_{20}H_{18}OH$
$(C_{18}H_{37}NH_3)_3B_{20}H_{18}OH$
$(C_6H_5NH_3)_3B_{20}H_{18}OH$, and the like Compounds bearing hydrocarbyloxy substituents are represented generically by the formulas
$M_a(B_{20}H_{17}OR)_b$ (6) or $M_{a'}(B_{20}H_{18}OR)_{b'}$ (6a) where M, $a$, $b$, $a'$ and $b'$ are defined as in Formulas 1 and 1a. Representative examples of hydrocarbyloxy-substituted compounds are as follows:

$H_4B_{20}H_{17}OCH_3$,
$Li_4B_{20}H_{17}OC_2H_5$,
$Na_4B_{20}H_{17}OC_8H_{17}$,
$Rb_4B_{20}H_{17}OC_{12}H_{25}$,
$Ag_4B_{20}H_{17}OC_6H_5$,
$Pb_2B_{20}H_{17}OC_6H_4—C_6H_5$,
$[(C_4H_9)_4N]_3B_{20}H_{18}OC_6H_{11}$,
$(NH_3CH_2CH_2NH_3)_3(B_{20}H_{18}OC_5H_{11})_2$,
$[Co(NH_3)_6(B_{20}H_{18}OC_3H_7)_2]$,
$Eu(H_2O)_6B_{20}H_{18}OC_2H_5$,
$Al(H_2O)_6B_{20}H_{18}OC_4H_9$, and the like.

Compounds bearing amino substituents are represented generically by the formulas $M_a(B_{20}H_{17}NH_2)_b$ (7) or $M_{a'}(B_{20}H_{18}NH_2)_{b'}$ (7a) where M, $a$, $b$, $a'$ and $b'$ are defined as in Formulas 1 and 1a. Representative examples of amino-substituted compounds are as follows:

$Na_4B_{20}H_{17}NH_2$,
$Tl_4B_{20}H_{17}NH_2$,
$Ca_2B_{20}H_{17}NH_2$,
$[(CH_3)_3S]_4B_{20}H_{17}NH_2$,
$(NH_2NH_3)_3B_{20}H_{18}NH_2$,
$[(C_6H_{11})_2NH_2]_3B_{20}H_{18}NH_2$,
$(C_5H_5NH)_3B_{20}H_{18}NH_2$,
$(C_{18}H_{37}NH_3)_3B_{20}H_{18}NH_2$,
$(C_6H_5CH_2NH_3)_3B_{20}H_{18}NH_2$, and the like.

The cation M in the compounds can be hydrogen ($H^+$) or, in its hydrated form, hydronium ($H_3O^+$). These compounds are strong acids and they form an important group of the compounds of Formula 1. Illustrations of these acids are as follows:

$H_4B_{20}H_{18}$,
$H_4B_{20}H_{17}OH$,
$H_4B_{20}H_{17}OCH_3$,
$H_2B_{20}H_{17}OCH_2C_6H_5$,
$H_4B_{20}H_{17}OC_6H_{11}$,
$H_4B_{20}H_{17}OC_6H_5$,
$H_4B_{20}H_{17}OC_{12}H_{25}$,
$H_4B_{20}H_{17}NH_2$
(or $H_3B_{20}H_{17}NH_3$), and the like.

Acids of the tetravalent anions are generally obtained as hydrates having up to 12 or more molecules of water. In these hydrates up to 4 of the molecules of water are generally considered to be associated with the acid hydrogens. The hydrates of the acids are stable products and they form a preferred group of the acid derivatives. Illustrations of hydrates of acids are as follows:

$$(H_3O)_4B_{20}H_{18} \cdot 5H_2O$$

$(H_3O)_4B_{20}H_{18} \cdot 6H_2O$, $(H_3O)_4B_{20}H_{18} \cdot 8H_2O$, and the like. Acids having only four molecules of water of hydration are illustrated by $(H_3O)_4B_{20}H_{17}OH$, $(H_3O)_4B_{20}H_{17}OC_2H_5$, and the like.

PREPARATION OF UNSUBSTITUTED COMPOUNDS

Compounds which are free of X substituents are preferably prepared by reducing a salt of the divalent eicosaborate anion of the following formula $$M_{a''}(B_{20}H_{18})_{b''} \quad (8)$$

where M is defined as in Formula 1, and $a''$ and $b''$ are the smallest whole numbers which satisfy the equation $$2b'' = a'' \times \text{valence of M} \quad (8a)$$

The preparation of the reactions of Formula 8 is described fully in assignee's copending applications by V. A. Engelhardt, Ser. No. 199,572, filed May 31, 1962, and in my copending application, Ser. No. 199,573, filed May 31, 1962. Their preparation is also described briefly below and illustrated in the examples.

Acids and salts of the divalent octadecahydroeicosaborate anions of Formula 8 are obtained by oxidation of a decahydrodecaborate (2−) of the formula $$M_{a''}(B_{10}H_{10})_{b''} \quad (9)$$

where M is defined as in Formula 1, and $a''$ and $b''$ are defined as in Formulas 8 and 8a.

The process for preparing the unsubstituted compounds of the invention represented by Formula 3 can, therefore, be viewed as consisting of the following steps in which the intermediate products are not necessarily isolated prior to use in the succeeding step:

(a) oxidizing a decahydrodecaborate(2−) of Formula 9 to obtain a salt of the octadecahydroceicosaborate(2−) anion of Formula 8, and (b) reducing the octadecahydroeicosaborate(2−) obtained in step (a) to obtain a salt which falls within the scope of Formula 3 and, optionally, (c) reacting the product obtained in step (b) with an acid, base or salt containing a cation M which is desired in the final product, and isolating a compound of Formula 3.

Step (c) in the above procedure is optional and it is a simple metathetic reaction. A product which falls within the scope of Formula 3 can be isolated, if desired, directly from the reaction mixture in step (b).

Referring to step (a) in the above process, oxidation of the $B_{10}H_{10}^{-2}$ salt at conventional temperatures (e.g. 15°–30° C.) yields as the principal product a salt of the $B_{20}H_{18}^{-2}$ anion. In the event oxidation is conducted at low temperatures (e.g., 0° C. or lower), a product is obtained which is a mixture of salts of the $B_{20}H_{18}^{-2}$ and $B_{20}H_{19}^{-3}$ anions. Salts of the $B_{20}H_{19}^{-3}$ anion are, as stated earlier, acid salts represented by Formula 3a and they fall within the scope of Formula 1. It is possible, therefore, to combine oxidation and reduction of the $B_{10}H_{10}^{-2}$ anion in a single step to obtain as one product of the reaction a compound which falls within the scope of Formula 1.

The decahydrodecaborates, $M_{a'}(B_{10}H_{10})_{b'}$, are prepared by methods described fully in U.S. Patents 3,148,938; 3,148,939; and 3,149,163 to W. H. Knoth, Jr. The preparation of representative compounds is described in the examples. Any decahydrodecaborate(2−) can be employed, i.e., compounds in which M is any atom or group of atoms which can form one or more cations in water, are operable. For reasons of availability and cost, it is preferred to use decahydrodecaborates of Formula 9 in which M is hydrogen, hydronium, ammonium, substituted ammonium, an alkali metal or an alkaline earth metal. Specific illustrations of the classes of preferred reactants are: $H_2B_{10}H_{10}$ and its hydrates, $Na_2B_{10}H_{10}$, $Cs_2B_{10}H_{10}$, $K_2B_{10}H_{10}$, $Li_2B_{10}H_{10}$, $BaB_{10}H_{10}$, $CaB_{10}H_{10}$, $MgB_{10}H_{10}$, $(NH_4)_2B_{10}H_{10}$, $[(CH_3)_4N]_2B_{10}H_{10}$, $[(C_2H_5)_3NH]_2B_{10}H_{10}$, $[(CH_3)_2NH_2]_2B_{10}H_{10}$, and the like.

Oxidation Step to $B_{20}H_{18}^{-2}$ Compounds—Oxidation of the decaborate reactant is accomplished either chemically or electrolytically.

In chemical oxidation the oxidizing reagent or oxidant is a compound having as a characteristic component a metal of variable valence, which metal is in its highest valence state, said compound having an oxidation-reduction potential in acid solution of about −1.33 to about −1.61 volts. The oxidation-reduction potential of a compound is a recognized and measurable property for which values are found in readily available texts, e.g., "Oxidation Potentials," by W. G. Latimer, 2nd ed., Prentice-Hall, New York (1952), particularly page 344. Examples of classes of compounds which are operable in the process are dichromates, aurates, higher oxides of lead, manganic salts, permanganates, higher oxides of bismuth and salts of tetravalent cerium.

The chemical oxidation process is conducted by simple and uncomplicated procedures in conventional equipment. A solvent is generally employed which preferably is hydroxylated, e.g., methanol, water, and the like. Water is most conveniently used and it is therefore the preferred solvent.

The ratio in which the reactants are employed is not a critical factor for operability. However, the use of an excess of oxidant may lead to a decrease in yield of the desired product. It is preferable to employ at most two oxidation equivalents of the oxidant (based on the metal) per mole of $B_{10}H_{10}^{-2}$ salt or acid used in the process. The preferred mole ratio of oxidant to polyhydropolyborate can be determined by methods described in "Handbook of Chemistry and Physics," 38th ed., p. 1588, Chemical Rubber Publishing Co. (1956).

Pressure is not a critical factor in the process and atmospheric pressure is normally used. However, if desired, pressures higher or lower than atmospheric can e employed.

The process is operable over a wide temperature range. However, as noted earlier, at low temperatures a salt of the $B_{20}H_{19}^{-3}$ anion may be obtained as well as a salt of the $B_{20}H_{18}^{-2}$. At temperatures of 0° C. or below, the yield of $B_{20}H_{19}^{-3}$ salt may be 50% or higher. The formation of the $B_{20}H_{19}^{-3}$ salt diminishes at higher temperatures of operation and at about 20° C. or higher, the product is principally a salt of the $B_{20}H_{18}^{-2}$ anion. Normally the reaction is conducted at the prevailing atmospheric temperature but temperatures as low as −10° C. or lower and as high as 100° C. can be employed. Preferred temperatures of operation lie between about 0° and 50° C. The product obtained in the process, whether a mixture of salts of $B_{20}H_{18}^{-2}$ and $B_{20}H_{19}^{-3}$ anions or pure salts of the $B_{20}H_{18}^{-2}$ anion can be used in the reduction step designated as (b).

The reaction proceeds rapidly and a measurable quantity of product is obtained within a short time. Normally the reactants are maintained in contact for a sufficient period to assure maximum yield. The time of reaction can range from a few minutes to 24 hours or more.

In the operation of the process it is preferable (although not essential) to add the oxidant to the decaborate to reduce the vigor of the reaction and to obtain the maximum yield of desired product. Normally, therefore, the reaction vessel is charged with the solvent and the decahydrodecaborate. The chemical oxidant, which is conveniently handled in solution, is added gradually to the vessel at a rate which provides a controllable reaction. After all of the oxidant has been added, the reaction mixture can be stirred for a short period and a solution containing the desired cation M is added. The polyborate salt frequently precipitates at this point but, in the event precipitation does not occur, the solution is evaporated to a volume at which a solid separates. The salt of the divalent anion, $B_{20}H_{18}^{-2}$, generally precipitates first from the solution and is separated by filtration. Further evaporation of the filtrate leads to the precipitation of the acid salt of Formula 3a, if it is formed under the conditions of operation. The products are purified further, if desired, by conventional procedures.

The electrolytic oxidation process for obtaining salts of the $B_{20}H_{18}^{-2}$ anion from salts of the $B_{10}H_{10}^{-2}$ anion is described fully in my copending application, Serial No. 199,573, filed May 31, 1962.

Reduction step—Salts of the $B_{20}H_{18}^{-2}$ anion and of the acid anion are obtained by a reduction process which consists in reacting the acid of the $B_{20}H_{18}^{-2}$ anion (usually as a hydrate), e.g., $(H_3O)_2B_{20}H_{18}$ having up to 8 molecules of water, with an active metal, i.e., a metal which has a standard electrode potential at 25° C. of at least about 0.75 volt [cf., "Handbook of Chemistry and Physics," 38th ed. (1956–57), p. 1660, Chemical Rubber Publishing Co.].

The reaction is readily conducted in aqueous solution and for this reason metals are usually employed which react controllably in aqueous medium. Metals such as Zn, Mg, Al, and the like, are preferred. The acid of the $B_{20}H_{18}^{-2}$ anion or one of its hydrates, is dissolved in water and portions of metal (turnings, shavings, pellets, and the like) are added gradually. The reaction is vigorous and, as in the previous processes, a gas is evolved. The reaction can be controlled by appropriate means, e.g., cooling, dilution with water or very slow rate of addition of metal. When no further gas evolution occurs with addition of metal, unreacted solid material is separated and the clear solution is processed as described for the previous processes.

Preparation of substituted compounds—Compounds of Formula 1 in which X is —OH are obtained by reacting a salt of the $B_{20}H_{18}^{-2}$ anion with a strong base. The reaction is conveniently performed in water to which water-miscible organic solvents can be added, if desired, to increase the solubility of the salts. The salt of the $B_{20}H_{18}^{-2}$ anion and the strong base is added to the solvent to form a clear solution which is heated and stirred until the solution is colorless. The solution is cooled and it is processed as described in the preparation of the unsubstituted salts to obtain a salt of the tetravalent anion.

Any salt of a $B_{20}H_{18}^{-2}$ anion can be used but, as a matter of convenience, the alkali metal, alkaline earth metal, ammonium or substituted ammonium salts are used. The term a strong base, as used herein, means a compound whose base strength is equivalent to an alkali metal hydroxide. The bases which are preferred for use in the process are the alkali metal hydroxides (LiOH, NaOH, KOH, CsOH), alkaline earth metal hydroxides [$Ca(OH)_2$, $Ba(OH)_2$, $Sr(OH)_2$], and quaternary ammonium hydroxides [$R_4NOH$, where R is aralkyl or lower alkyl, e.g., $(CH_3)_4NOH$, $(C_2H_5)_4NOH$, $(C_6H_5CH_2)(CH_3)_3NOH$, and the like].

The ratio in which the reactants are employed is not a critical factor. Sufficient base is employed to keep the solution alkaline, a condition which is readily determined by conventional methods, e.g., color indicators, potentiometric measurement, and the like. In general, the ratio, moles $B_{20}H_{18}^{-2}$ salt/moles strong base, lies between about 0.1 and 20.

The reaction is conducted readily at atmospheric pressure. It can be operated at pressures higher or lower than atmospheric but no advantages are found under these conditions of operation. The reaction proceeds at normal atmospheric temperatures but, to increase the speed of the reaction, the mixture is usually heated to the boiling point of the solution. The temperature of the reaction may lie between about 10° C. and about 100° C. The time of the reaction may be from a few minutes to 24 hours or more.

Compounds of Formula 1 in which X is —OR are obtained by reacting a salt of the $B_{20}H_{18}^{-2}$ anion with a metal alkoxide or phenoxide. The reaction is conducted in the manner described for the preparation of —OH substituted compounds and need not be repeated here. The preferred alkoxides or phenoxides are compounds of the formula M″OR, where M″ is sodium or potassium and R is defined as in Formula 1.

Compounds of Formula 1 in which X is —NH$_2$ are obtained by reacting a salt of the $B_{20}H_{18}^{-2}$ anion with an alkali metal amide of the formula M″NH$_2$, where M″ is, preferably sodium or potassium. The reaction is conveniently conducted in liquid ammonia as a solvent. Any salt of the $B_{24}H_{18}^{-2}$ anion can be used but the ammonium salt $(NH_4)_2B_{20}H_{18}$ is preferred. The reaction is conducted by conventional procedures wherein the eicosaborate and the alkali metal amide are simply mixed in liquid ammonia and the reaction is continued until all the liquid ammonia is removed by evaporation. The residue is processed in the usual manner, due care being exercised to destroy excess metal amide, if present, prior to working up the residue. The crude product is purified by conventional crystallization procedures as described in the preparation of —OH substituted compounds.

In all of the above processes for the preparation of unsubstituted or substituted compounds, the crude reaction products are purified by well-known and recognized procedures. Conventional crystallization procedures are used most frequently, employing water or inert organic solvents, e.g., benzene or alcohol. Solutions of the products can be treated with absorptive agents, e.g., activated carbon or silica gel, to absorb the major portion of the impurities.

Metathetic reactions—Compounds of Formula 1 wherein M covers a wide range of cations are obtained by simple metathetic reactions. To illustrate, an aqueous solution of a compound of Formula 1, where M is $NH_4^+$, is contacted with a strong acid or with a strong acid ion-exchange resin to obtain the free acid, i.e., a compound of Formula 1 in which M is H. The acid, generally in solution, is reacted with oxides of metals, hydroxides of metals, salts of metals (both organic and inorganic), nitrogen bases, sulfonium halides, phosphonium halides, aryldiazonium hydroxides or halides, and similar types of compounds to obtain products of Formula 1 which have the desired cation M. In a process employing an ion-exchange resin, strongly acidic resins of the sulfonic acid variety are preferred because of availability, e.g., "Amberlite" IR–120–H and "Dowex" 50. The acid, usually obtained in aqueous solution, can be reacted with nitrates, chlorides, bromides, acetates, benzoates, and similar salts of metals or other bases to obtain salts of Formula 1.

To illustrate, an aqueous solution of $Cs_4B_{20}H_{18}$ is passed through a column packed with "Amberlite" IR–120–H to obtain in aqueous solution the acid $H_4B_{20}H_{18}$. The aqueous solution is evaporated under reduced pressure to obtain the acid $H_4B_{20}H_{18}$ generally as a solid hydrate having up to 12 molecules of water. In the hydrated form part of the water of hydration is considered to be associated with the ionizable protons, e.g., $$(H_3O)_4B_{20}H_{18} \cdot 4H_2O, \; (H_3O)_4B_{20}H_{18} \cdot 6H_2O,$$

$(H_3O)_4B_{20}H_{18} \cdot 8H_2O$, and the like. It is understood that when reference is made to acids of $B_{20}H_{18}-nX_n^{-4}$ anions, the hydrates of these acids are included.

Examples of other acids which can be obtained and the salts from which they can be derived are shown in Table 1:

TABLE 1

| Compound: | Acid obtained (as hydrates) |
|---|---|
| $K_4B_{20}H_{18}$ | $H_4B_{20}H_{18}$ |
| $[(CH_3)_3S]_4B_{20}H_{18}$ | $H_4B_{20}H_{18}$ |
| $Na_3B_{20}H_{19}$ | $H_4B_{20}H_{18}$ |
| $(NH_4)_4B_{20}H_{17}OH$ | $H_4B_{20}H_{17}OH$ |
| $(NH_4)_3B_{20}H_{18}NH_2$ | $H_4B_{20}H_{17}NH_2$ |
| $Cs_4B_{20}H_{17}OC_2H_5$ | $H_4B_{20}H_{17}OC_2H_5$ |
| $(C_3H_7NH_3)_3B_{20}H_{18}OC_6H_5$ | $H_4B_{20}H_{17}OC_6H_5$ |
| $(C_5H_5NH)_3B_{20}H_{18}OC_{12}H_{25}$ | $H_4B_{20}H_{17}OC_{12}H_{25}$ |
| $Na_3B_{20}H_{18}OH$ | $H_4B_{20}H_{17}OH$ |

Careful concentration of the solutions of the acids and intensive drying under low pressure and moderate temperature of the liquid residues yield the acids, generally as hydrates as discussed earlier. For many chemical reactions it is not necessary to isolate the acids from solution. The solutions of the acids can be employed directly, especially in metathetic reactions.

Metal salts of the invention can be prepared by neutralization of the acids, obtained as described above, in aqueous or alcohol solution with an aqueous solution or suspension of an inorganic base, e.g., an alkali or alkaline earth metal hydroxide. The resulting solution of the metal salt of the $(B_{20}H_{18-n}X_n)^{-4}$ anion or of the acid anion is concentrated by evaporation of water or alcohol until the salt crystallizes out. In many cases the salt may precipitate during its preparation and evaporation of the solution is not necessary. The crystalline salt is dried under reduced pressure, e.g., 0.1 mm. of mercury, or lower, and moderately elevated temperature, e.g., 50–100° C. The metal salts frequently contain water of hydration which can be removed by heating for several hours at a temperature of about 200° C. under low pressure, e.g., 0.1 mm. mercury or lower. Specific examples of salts which can be obtained by the process described above are:

$Na_4B_{20}H_{18}, \; K_3B_{20}H_{19}, \; (NH_4)_3B_{20}H_{19},$
$[Ni(NH_3)_6]_3(B_{20}H_{19})_2, \; Na_4B_{20}H_{17}OH,$
$K_4B_{20}H_{17}OC_6H_5, \; Li_4B_{20}H_{17}OC_3H_7,$
$[(CH_3)_4N]_3B_{20}H_{18}OC_6H_{11}, \; Mg_2B_{20}H_{17}OH,$
$Ba_2B_{20}H_{17}OH, \; Ca_2B_{20}H_{17}NH_2, \; Sr_2B_{20}H_{17}OCH_3,$ and the like.

Water-insoluble heavy metal salts of the acids can be prepared by adding a water-soluble heavy metal salt, e.g., silver nitrate or mercuric nitrate, to an aqueous solution of the boron-containing acid whereupon the heavy metal salt of the anion precipitates out as a white or light colored solid. The salts formed in this procedure are usually anhydrous. Examples of heavy metal salts which can be prepared by this method are: $Ag_4B_{20}H_{18}$, $Pb_3[B_{20}H_{19}]_2$, $Hg_2B_{20}H_{17}OC_2H_5$, $Hg_2B_{20}H_{17}OH$, and $Ag_4B_{20}H_{17}OCH_3$. The procedure is generic to the preparation of metal salts of the compounds of the invention and it can be employed with unsubsituted and substituted compounds.

Nitrates, carbonates, chlorides or oxides of metals can be used to prepare the salts by the methods described earlier.

Light-sensitive salts, e.g., the silver salts, are preferably prepared under conditions providing minimum exposure to light although exclusion of light is not essential for operability.

Compounds of Formula 1, where M is an alkali or alkaline earth metal, e.g., Na, K, Cs, Ca, Ba, Mg, and Sr, can undergo simple metathetic reactions with other salts to effect an exchange of cations. Thus, $Na_4B_{20}H_{18}$ or $K_4B_{20}H_{17}OH$ can be reacted in aqueous solution with ammonium sulfate, benzenediazonium hydroxide, pyridinium chloride, morpholinium sulfate, polyethyleneimine hydrochloride, and the like, to form compounds of Formula 1 having ammonium, benzenediazonium, pyridinium, morpholinium, and the like, as cations. These illustrations are not limiting and they demonstrate the breadth of metathetic reactions which can be used.

Compounds of the invention in which the group M is a metal, particularly a transition metal, or a Werner-type complex, frequently contain solvent of crystallization when isolated by conventional methods. The solvent, e.g., water, can be bound loosely in the lattices of the crystals or it can be associated by stronger bonds with the metal cation or Werner-type complex cation. Solvent of crystallization, entrapped in crystal lattices, is removed easily by well-known procedures, e.g., heating under reduced pressure. Solvent of crystallization which is associated with the cation is more difficult to remove, and for most applications it is not necessary to remove completely this type of bound solvent.

The products of the invention and processes for obtaining them are illustrated in the following examples. The preparation of a representative compound of the type $M_{a'}(B_{10}H_{10})_{b'}$, which is employed as a reactant, is also illustrated.

EXAMPLE A (A) Preparation of Bis(dimethyl sulfide)decaborane-(12).—A reaction vessel having a capacity of about 365 g. of water is charged with 0.79 g. of decaborane (14), cooled in liquid nitrogen, and then evacuated to a pressure of 10 microns of mercury. Approximately 21 g. of dimethyl sulfide is condensed onto the decaborane in the reaction vessel. The reaction vessel is closed, allowed to warm to room temperature and stand for 4 days. During this time 6.6 millimoles of hydrogen is evolved. The reaction vessel is opened and excess dimethyl sulfide is removed by distillation, leaving a practically quantitative yield of white solid residue of $B_{10}H_{12} \cdot 2(CH_3)_2S$. The compound is recrystallized from ethyl acetate and it melts at 122–124° C. The compound is called bis(dimethyl sulfide)decaborane(12).

The above procedure is equally operable with other organic sulfides.

(B) Preparation of $M_2B_{10}H_{10}$ (where M is $NH_4$).—Bis(dimethyl sulfide)decaborane(12) (8.5 g.) is mixed with 50 ml. of liquid ammonia and stirred in a round-bottom reaction vessel for 1 hour with the vessel being cooled to a temperature of about −50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of $(NH_4)_2B_{10}H_{10}$.

Example B, which follows, illustrates the preparation of salts of the $B_{20}H_{18}^{-2}$ anion which are employed as reactants to prepare the compounds of the invention.

EXAMPLE B (A) Preparation of $M_2B_{20}H_{18}$ (where M is a monovalent cation).— A reaction vessel is charged with 100 ml. of water and 1.46 g. of $(NH_4)_2B_{10}H_{10}$. The mixture is stirred and a solution of 5.4 g. of $Ce(NH_4)_2(NO_3)_6$ in 80 ml. of water is added gradually. Evolution of gas occurs and a deep blue-violet solution forms. A concentrated aqueous solution of $(CH_3)_4NCl$ is added to the reaction mixture with stirring and in sufficient amount to precipitate completely a violet-colored solid. The solid is separated by filtration and it is purified by crystallization from hot water to yield the yellow compound, bis-(tetramethylammonium) octadecahydroeicosaborate(2−).

The compound is soluble in acetonitrile, hot methanol and hot water. The identity of the product is confirmed by elemental analysis.

*Analysis.*—Calc'd for $[(CH_3)_4N]_2B_{20}H_{18}$: C, 25.1; H, 11.1; N, 7.32; B, 56.5; Eq. Wt., 191.4. Found: C, 26.3; H, 11.5; N, 7.55, 7.80; B, 54.3; Eq. Wt., 188, 204.

(B) A solution of $[(CH_3)_4N]_2B_{20}H_{18}$ in methanol-water is passed through a column packed with a commercial acidic ion-exchange resin of the polysulfonic acid type. The effluent is a solution of the acid $H_2B_{20}H_{18}$, or, expressed as a hydronium acid, $(H_3O)_2B_{20}H_{18}$. The aqueous solution is used without further processing to prepare salts of the acid. The solid acid is obtained by evaporating the aqueous solution, prepared as described above, to dryness at very low pressure (less than 0.1 mm. of mercury). The acid, which forms large intensely colored yellow crystals, contains 6 moles of water of hydration, of which 2 moles are considered to be associated with the proton cations. The identity of the compound is confirmed by elemental analysis.

*Analysis.*—Calc'd for $(H_3O)_2B_{20}H_{18} \cdot 4H_2O$: H, 9.36; B, 62.8. Found: H, 8.91; B, 63.7.

The solid yellow crystals of the hydrated acid obtained above are very hygroscopic. They dissolve in water to form a clear solution.

(C) A portion of an aqueous solution of the dibasic acid, prepared as described in Part B, is titrated with an aqueous solution of sodium hydroxide until the reaction mixture is neutral (pH=7). The resulting aqueous yellow solution is evaporated to dryness under reduced pressure (less than 1 mm. of Hg) to obtain crude $Na_2B_{20}H_{18}$ as a tan-colored solid. The compound is purified by crystallization from methanol. The product so obtained contains water of crystallization.

*Analysis.*—Calc'd for $Na_2B_{20}H_{18} \cdot 2H_2O$: B, 68.3; H, 7.07. Found: B, 68.2; H, 7.25.

The compound can, if desired, be obtained free of solvent of crystallization by heating for a time at very low pressure. The molecular weight of the compound $Na_2B_{20}H_{18}$, determined by freezing point depression in aqueous solution gives the following values: 103, 99, 89, 88, i.e., an average molecular weight of 95; calculated value: 93.3.

The compounds of Example B are characterized fully in my copending application, Ser. No. 199,573, filed May 31, 1962 and referred to in a preceding paragraph.

The preparation of compounds of Formula 1 which are free of X groups is illustrated in Examples 1–4.

EXAMPLE 1

Approximately 3.0 g. of magnesium turnings are added gradually and with stirring to about 50 ml. of an aqueous 0.2 M solution of $H_2B_{20}H_{18}$. A vigorous exothermic reaction sets in and gas is evolved. Water is added to abate the vigor of the reaction and the mixture is allowed to stand at about 25° C. for 24 hours. The solution, which is colorless, is filtered to separate the unreacted metal. The filtrate is neutralized with $NH_4OH$. The solution at this stage contains $(NH_4)_4B_{20}H_{18}$. Aqueous CsCl solution is added and the solution is stirred for several minutes. A green solid precipitates which is separated by filtration. The product is crystallized from hot water to obtain a colorless crystalline compound which is a hydrate of $Cs_4B_{20}H_{18}$. It is dried at 100° C. under very low pressure.

*Analysis.*—Calc'd for $Cs_4B_{20}H_{18} \cdot H_2O$: Cs, 67.8; B, 27.6; H, 2.57. Found: Cs, 66.5; B, 27.4, 27.5; H, 3.23.

EXAMPLE 2

Zinc metal and an aqueous solution of $H_2B_{20}H_{18}$, prepared as described in Example B, Part B, are mixed until the acid solution becomes colorless and gas evolution ceases. The period of mixing is about 24 hours. The solution is decanted from excess metal and an aqueous solution of $(CH_3)_4NCl$ is added to the clear liquid. A white precipitate forms which is separated and recrystallized from acidified aqueous solution. The product is a mixture of hydrates of $[(CH_3)_4N]_3HB_{20}H_{18}$ and $$[(CH_3)_4N]_2H_2B_{20}H_{18}.$$

These compounds can also be written as $$[(CH_3)_4N]_3B_{20}H_{19}$$

and $[(CH_3)_4N]_2HB_{20}H_{19}$. The elemental analysis of the product is as follows:

*Analysis.*—Calc'd for $$[(CH_3)_4N]_{2.75}(H_3O)_{0.25}B_{20}H_{19} \cdot 5.25H_2O$$

C, 24.5; H, 11.8; H, 7.15; B, 40.2. Found: C, 24.8; H, 10.4; N, 7.22; B, 40.2;

EXAMPLE 3

Magnesium turnings are added to a solution of $(NH_4)_2B_{20}H_{18}$, the mixture is stirred and dilute hydrochloric acid is added gradually. A gas is generated and, after all the acid is added, the solution is stirred for about 20 hours. The solution is now colorless and no more gas is evolved. The mixture is filtered and an aqueous solution of $(CH_3)_4NCl$ is added to the filtrate. The white precipitate which forms is separated, and recrystallized from water to obtain $[(CH_3)_4N]_3HB_{20}H_{18}$, which can also be viewed as $[(CH_3)_4N]_3B_{20}H_{19}$. The identity of the compound is confirmed by its infrared absorption spectrum.

Examples 1–3 illustrate the preparation of $B_{20}H_{18}^{-4}$ and $B_{20}H_{19}^{-3}$ salts by employing an active metal as the reducing agent. The process is generic to the preparation of $B_{20}H_{18}^{-4}$ and its acid salts. Metals such as Sn, Al, Fe, and the like can be employed. The solution can be neutralized with bases other than $NH_4OH$, as described in the paragraph following Example 11 to provide a broad range of salts of the invention. Similarly, halides other than CsCl can be employed, e.g., NaCl, $CaCl_2$, $AlCl_3 \cdot 6H_2O$, $MgCl_2$, and the like can be used in the process to obtain salts of the formulas $Na_4B_{20}H_{18}$, $Ca_2B_{20}H_{18}$, $$[Al(H_2O)_6]_4(B_{20}H_{18})_3,$$

and $[Mg(H_2O)_6]_2B_{20}H_{18}$.

Any strong acid can be used in the process, e.g., sulfuric, trifluoroacetic, trichloroacetic, benzenesulfonic and benzenephosponic acid. Acids which will react with metals to release hydrogen are generically useful.

EXAMPLE 4

(A) A cold aqueous solution of 12.6 g. of cerium ammonium sulfate is added slowly to an ice-water solution of 3.0 g. of $(NH_4)_2B_{10}H_{10}$. The reaction mixture is warmed to atmospheric temperature (ca. 25° C.) and a saturated aqueous solution of $(CH_3)_4NCl$ is added with stirring. A precipitate forms and it is separated by filtration, washed and dried. It is shown by infrared and ultraviolet absorption spectroscopy to be a mixture of $[(CH_3)_4N]_2B_{10}H_{18}$ and $[(CH_3)_4N]_3B_{20}H_{19}$, also written as $$[(CH_3)_4N]_3HB_{20}H_{18}.$$

The mixture is stirred with acetonitrile and filtered. The insoluble portion is [(CH₃)₄N]₃B₂₀H₁₉ and the filtrate contains the salt of the divalent anion. The yield of [(CH₃)₄N]₃B₂₀H₁₉ is 10%. The product is purified by recrystallization from hot water and dried under very low pressure at 100° C. to obtain a white, crystalline compound containing water of crystallization.

*Analysis.*—Calc'd for [(CH₃)₄N]₃B₂₀H₁₉·0.5H₂O: C, 30.9; H, 12.1; N, 9.00; B, 46.03. Found: C, 30.0, 29.9; H, 12.0, 12.0; N, 9.07, 9.13; B, 46.9, 46.7.

The above compound, heated to 300° C., decomposes without fusion.

(B) The process of Part A is repeated except triethylammonium chloride is used in place of tetramethylammonium chloride to precipitate the product. The isolated product is dried under very low pressure at 100° C. to obtain anhydrous [(C₂H₅)₃NH]₃B₂₀H₁₉. The compound melts at 164–166° C. with decomposition.

*Analysis.*—Calc'd for [(C₂H₅)₃NH]₃B₂₀H₁₉: C, 39.9; H, 12.5; N, 7.75; B, 39.9; active H₂, 1694 ml./g. Found: C, 40.2; H, 13.0; N, 7.63; B, 39.9; active H₂, 1685 ml./g., 1658 ml./g.

The process of Example 4, which is a one-step oxidation-reduction process, is generic for the preparation of salts of the B₂₀H₁₉⁻³ anion. A wide range of salts can be obtained by employing salts other than the trialkylammonium hydrochlorides in the final step, e.g., pyridine hydrochloride will yield (C₅H₅NH)₃B₂₀H₁₉, glycine hydrochloride will yield

and (CH₃)₃SCl will yield [(CH₃)₃S]₃B₂₀H₁₉.

The preparation of compounds of the invention which bear X substituents is illustrated in Examples 5–10.

EXAMPLE 5

(A) A reaction vessel is charged with 5.0 g. of

5.0 g. of (CH₃)₄NOH and sufficient CH₃CN–H₂O mixture (about 1:1 by volume) to form a clear solution. The solution is heated to boiling and acetonitrile is distilled from the mixture. The yellow color of the solution gradually disappears and a colorless solution remains. The solution is cooled to prevailing atmospheric temperature (ca. 25° C.) and a small quanity of solid product precipitates. The solid is separated and dried to yield a white crystalline hydrate of [(CH₃)₄N]₄B₂₀H₁₇OH.

(B) A reaction vessel is charged with 1000 ml. of water and 135 g. of [(CH₃)₄N]₂B₂₀H₁₈. The mixture is heated to boiling to form a solution and 61 g. of

is added with stirring. The solution is stirred for 3 hours at the boiling point. The solution is filtered while hot and the filtrate is allowed to cool slowly to atmospheric temperature with intermittent filtration to remove the precipitate as it separates in stages. There is obtained as the first crop of crystals 151 g. of

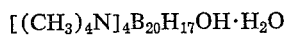

and, as the final crop of crystals at atmospheric temperature, 4 g. of the acid salt [(CH₃)₄N]₃B₂₀H₁₈OH. The latter compound is recrystallized from hot water and dried under reduced pressure. The infrared spectrum of the compound has a strong absorption band at 1800 cm.⁻¹ (5.4μ) showing a B—H—B bond.

*Analysis.*—Calc'd for [(CH₃)₄N]₃B₂₀H₁₈OH·H₂O: C, 30.4; H, 11.4; N, 8.96; B, 44.4. Found: C, 30.5; H, 11.2; N, 9.15; B, 41.5.

EXAMPLE 6

The process of Example 5–A is repeated except that CsOH is employed in place of (CH₃)₄NOH. The product obtained is a hydrate of Cs₄B₂₀H₁₇OH, a white crystalline solid.

*Analysis.*—Calc'd for Cs₄B₂₀H₁₇OH·H₂O: Cs, 66.3; B, 27.0. Found: Cs, 66.4, 65.0; B, 26.6.

EXAMPLE 7

(A) The process of Example 5–A is repeated except that KOH is employed in place of (CH₃)₄NOH. The product obtained is a hydrate of K₄B₂₀H₁₇OH, a white crystalline solid.

*Analysis.*—Calc'd for K₄B₂₀H₁₇OH·H₂O: B, 48.6; H, 5.44. Found: B, 49.0; H, 5.14.

The infrared spectrum of the above potassium salt shows absorption at the following wavelengths (expressed in microns): 4.1, 9.0, 10.0, and 12.0.

(B) A solution is prepared consisting of 14.0 ml. of 0.157 M (H₃O)₂B₂₀H₁₈ diluted to a volume of 50 ml. with water. This solution is added with stirring to a solution consisting of 50 ml. of water, 0.5 g. of KOH and 0.52 g. of NaBH₄. Gas is evolved during this step. The solution is stirred for 2–3 hours and the yellow color disappears. An aqueous solution of (CH₃)₄NOH is added and the small quantity of precipitate which forms is separated by filtration. The precipitate is by-product

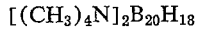

The clear filtrate is concentrated by evaporation until a solid separates in the form of colorless plates. The product is separated by filtration and it is dried to yield a hydrate of [(CH₃)₄N]₄B₂₀H₁₇OH. The compound is very hygroscopic.

*Analysis.*—Calc'd for [(CH₃)₄N]₄B₂₀H₁₇OH·7H₂O: C, 28.2; H, 12.2; B, 31.8. Found: C, 28.8, 29.1; H, 11.3, 11.0; B, 29.6

The electrical conductivity of the above salt is determined in aqueous solution at various concentrations and from the data a plot is made of the equivalent conductance of the solution as a function of the square root of the concentration of the salt. The data show that the compound is a 1–4 electrolyte.

(C) A reaction vessel is charged with an aqueous solution of Na₂B₂₀H₁₈ (equivalent to 9.44 g. of H₂B₂₀H₁₈) and a solution of 3.78 g. of NaBH₄ in 100 ml. of water containing 2 g. of NaOH is added with stirring. Several color changes in the solution are observed in this operation and a gas is evolved. The solution is stirred 10 hours at prevailing atmospheric temperature (ca. 25° C.). The solution is cooled to about 0° C. and an aqueous solution of (CH₃)₄NOH is added. A white precipitate forms which is separated by filtration, washed and dried to obtain [(CH₃)₄N]₄B₂₀H₁₇OH.

A portion (0.5 g.) of the above compound is dissolved in water and 3 ml. of concentrated hydrochloric acid is added. The white precipitate which forms is separated, washed with water and methanol, and dried. The product is a mixture (approximately equimolar) of acid salts of the formulas [(CH₃)₄N]₃HB₂₀H₁₇OH and

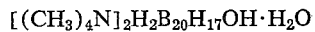

which can also be viewed as salts of

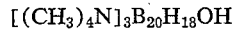

and [(CH₃)₄N]₂(H₃O)B₂₀H₁₈OH. The group (H₃O) represents a hydronium ion or hydrated hydrogen ion.

Analysis.—Calc'd for

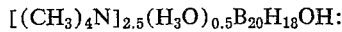

C, 25.9; H, 11.3; N, 7.5; B, 46.6. Found: C, 26.5, 26.3; H, 11.3, 11.1; N, 7.9, 8.0; B, 48.9, 48.9.

EXAMPLE 8

(A) A concentrated aqueous solution (10 ml.) of H₂B₂₀H₁₈ (approximately 15 moles of H₂O per mole of acid) is titrated with hydrazine hydrate (NH₂NH₂·H₂O) until the solution is basic. The solution becomes warm during the titration. It is cooled to prevailing atmospheric temperature (about 25° C.) and white crystals form. The crystals are separated and dried under reduced pressure at 150° C. to obtain $(NH_2NH_3)_4B_{20}H_{17}OH$. The identity of the compound is confirmed by its infrared absorption spectrum and by elemental analysis.

*Analysis.*—Calc'd for $(NH_2NH_3)_4B_{20}H_{17}OH$: N, 29.3; H, 10.0; B, 56.5. Found: N, 28.8; H, 10.0; B, 56.8.

(B) Approximately 0.5 g. of $[(C_2H_5)_3NH]_2B_{20}H_{18}$ and 1 ml. of anhydrous hydrazine (99+ purity) are mixed in a vessel. The mixture is warmed under reduced pressure until the by-product triethylamine and excess hydrazine are removed. A white crystalline product remains which is $(NH_2NH_3)_4B_{20}H_{17}OH$, with hydrazine of crystallization.

(C) Approximately 0.5 g. of $[C_2H_5)_3NH]_3B_{20}H_{18}$ (prepared as described in Example 4-B) is dissolved in 1.2–1.3 ml. of anhydrous hydrazine. The solution is processed as described in Part A above to obtain $$(NH_2NH_3)_4B_{20}H_{17}OH$$

containing hydrazine and water of crystallization.

(D) Sufficient hydrazine (95%+) is added to a hydrate of the acid of the divalent anion $(B_{20}H_{18}^{-2})$, prepared as described in Example B, Part B, to form a solution. The solution is yellow and it is heated on a steam bath (80–100° C.). Bubbles form in the solution and the yellow color disappears in about 10 minutes. The mixture at this stage is a solution of $(NH_2NH_3)_4B_{20}H_{17}OH$ in hydrazine.

The solution is diluted with water and an aqueous solution of $TlNO_3$ is added. The precipitate which forms is separated and dried in air to yield $Tl_4B_{20}H_{17}OH$. The compound is a white crystalline product whose identity is confirmed by its infrared absorption spectrum.

The compound $(NH_2NH_3)_4B_{20}H_{17}OH$ is conveniently handled in solution in hydrazine from which it can be isolated, if desired, as a white crystalline solid, by evaporation of the hydrazine. The identity of the product is confirmed by elemental analysis.

*Analysis.*—Calc'd for $(NH_2NH_3)_4B_{20}H_{17}OH$: B, 56.3; N, 29.2; H, 10.4. Found: B, 56.9, 56.8; N, 28.7, 28.8; H, 10.0.

Hydrazine solutions of $(NH_2NH_3)_4B_{20}H_{17}OH$ containing up to 50% or more by weight of the salt are stable compositions having a high boron content.

Examples 5–8, inclusive, illustrate the preparation of salts of $B_{20}H_{17}OH^{-4}$ anion employing a strong base as the reactant. The process is generic to the preparation of $B_{20}H_{17}OH^{-4}$ salts, employing any strong base as the reducing and hydroxylating agent and any salt of a divalent eicosaborate anion, e.g., the salts of Example B, Parts A–C, inclusive. Operable bases include alkali metal hydroxides, alkaline earth metal hydroxides, quaternary ammonium hydroxides, tri-substituted sulfonium hydroxides and tetra-substituted phosphonium hydroxides. In the operation of the process, the solution is preferably heated until the yellow color disappears, generally at a temperature of 50–150° C.

Example 9, which follows, illustrates an optional and indirect method for preparing compounds bearing a hydroxyl group. In this method compounds bearing an —OR substituent are reacted with aqueous HI solution to convert the —OR group into an —OH group.

EXAMPLE 9

The product from Example 10, Part B, is dissolved in water and aqueous hydrogen iodide solution is added. The mixture is heated to boiling for a short time, aqueous $(CH_3)_4NCl$ solution is added and the mixture is cooled. The precipitate which forms is separated, recrystallized from water and dried under reduced pressure to obtain a mixed cesium-tetramethylammonium acid salt which is principally $Cs[(CH_3)_4N]_2HB_{20}H_{17}OH$, or alternatively, $Cs[(CH_3)_4N]_2B_{20}H_{18}OH$. The identity of the compound is confirmed by its infrared absorption spectrum.

Example 10, which follows, illustrates the preparation of compounds of Formula 1 in which X is —OR.

EXAMPLE 10

(A) A reaction vessel, fitted with a reflux condenser and stirrer, is charged with 20 g. of $[(CH_3)_4N]_2B_{20}H_{18}$ and sufficient acetonitrile-methanol mixture (1/1) to form a solution. The solution is heated to boiling and sodium methoxide is added in excess with stirring. An orange-colored gum forms, the solution is cooled and the gum is separated. The gum is dissolved in hot water, the solution is made acid, cooled and a white crystalline solid precipitates. The solid is separated, recrystallized again from acidified water and dried under reduced pressure to obtain the acid salt $[(CH_3)_4N]_3B_{20}H_{18}OCH_3$ which can also be viewed as $[(CH_3)_4N]_3HB_{20}H_{17}OCH_3$.

*Analysis.*—Calc'd for above salt: H, 11.8; N, 8.61; B, 44.3. Found: H, 11.7; N, 8.22; B, 45.8.

(B) Employing the procedure of Part A, $Cs_2B_{20}H_{18}$ is reacted in aqueous solution with sodium methoxide for 2–3 hours to obtain a pale orange-colored product. The product is purified by crystallizing from water to which a small quantity of CsCl is added. The compound is the acid salt $Cs_3B_{20}H_{18}OCH_3$.

The acid salts obtained in Parts A and B of Example 10 can be used to prepare solutions of the acid $$H_4B_{20}H_{17}OCH_3$$

by processes which will be described later and the acid solutions can be neutralized completely with bases, e.g., $(CH_3)_4NOH$ or CsOH to obtain $[(CH_3)_4N]_4B_{20}H_{17}OCH_3$ and $Cs_4B_{20}H_{17}OCH_3$, respectively.

The process of Example 10 is generic for the preparation of compounds of Formula 1 in which X is —OR. To illustrate, $Na_2B_{20}H_{18}$ can be reacted with $NaOC_2H_5$ to obtain $Na_4B_{20}H_{17}OC_2H_5$; $K_2B_{20}H_{18}$ can be reacted with $KOC_8H_{17}$ to obtain $K_4B_{20}H_{17}OC_8H_{17}$; $Na_2B_{20}H_{18}$ can be reacted with $NaOC_6H_{11}$ to obtain $Na_4B_{20}H_{17}OC_6H_{11}$; $[(CH_3)_4N]_2B_{20}H_{18}$ can be reacted with $NaOC_6H_5$ to obtain $[(CH_3)_4N]_4B_{20}H_{17}OC_6H_5$; $Li_2B_{20}H_{18}$ can be reacted with $LiOC_{12}H_{25}$ to obtain $Li_4B_{20}H_{17}OC_{12}H_{25}$; and the like. The acid salts can be obtained as intermediate products as illustrated in Example 10, e.g., $Na_3B_{20}H_{18}OC_2H_5$, $K_3B_{20}H_{18}OC_8H_{17}$, $Na_3B_{20}H_{18}OC_6H_{11}$, $$[(CH_3)_4N]_3B_{20}H_{18}OC_6H_5$$

$Li_3B_{20}H_{18}OC_{12}H_{25}$, and the like.

Compounds of Formula 1 in which X is —NH₂ are obtained by reacting a salt of the divalent octadecahydroeicosaborate, e.g., $(NH_4)_2B_{20}H_{18}$, with an alkali metal amide in liquid ammonia. The procedure is closely related to the process described in Example 8 for the preparation of —OH substituted compounds. To illustrate, a solution of $NaNH_2$ in liquid ammonia is prepared and $$(NH_4)_2B_{20}H_{18}$$

is added gradually with stirring. The solution is stirred until the liquid ammonia is substantially evaporated and the residue is warmed to dryness. Unreacted $NaNH_2$ is destroyed, for example, by careful addition of absolute ethanol, and the remaining crude product is processed by dissolving in water, adding $(CH_3)_4NCl$ and separating the precipitate which is $[(CH_3)_4N]_4B_{20}H_{17}NH_2$. The acid salt can also be obtained in the process, e.g.

$$[(CH_3)_4N]_3B_{20}H_{18}NH_2$$

Acids of the formula $H_4B_{20}H_{17-n}X_n$, i.e., compounds of Formula 1, where M is hydrogen (or hydronium), are obtained by contacting salts of the trivalent or tetravalent eicosaborates with a strong acid, preferably an acid ion-exchange resin. To illustrate, an aqueous solution of $$(NH_4)_4B_{20}H_{18}$$

prepared as described in the first step of Example 1 is passed through a column filled with a commercial acid ion-exchange resin of the cross-linked polystyrene sulfonic acid type. The aqueous effluent is a solution of $H_4B_{20}H_{18}$ which can be evaporated to obtain a hydrate of the acid. The solution can be neutralized with a base, e.g., LiOH and evaporated to dryness to obtain a salt, e.g., $Li_4B_{20}H_{18}$. The process is described in more detail in Example 11 for the preparation of $H_4B_{20}H_{17}OH$. Both neutral and acid salts [Formula 1b] can be used in the process to yield tetra-basic acids.

EXAMPLE 11

An aqueous solution of $[(CH_3)_4N]_4B_{20}H_{17}OH$, prepared from the compound of Example 5, Part A, is passed through a column charged with a commercial acid ion-exchange resin of the polystyrene sulfonic acid type. The effluent is an aqueous solution of $H_4B_{20}H_{17}OH$. The solution is mixed with an aqueous solution of CsCl and the white precipitate which forms is separated by filtration. The product is crystallized from hot water to obtain tetra-cesium heptadecahydromonohydroxyeicosaborate(4−).

*Analysis.*—Calc'd for $Cs_4B_{20}H_{17}OH$: Cs, 67.8; B, 27.6; H, 2.57. Found: Cs, 67.8; B, 27.4; H, 2.70.

Titration curves for the acid $H_4B_{20}H_{18}$ and $H_4B_{20}H_{17}OH$ in aqueous solution show that in each acid three of the hydrogens are strongly acidic. The fourth hydrogen ionizes less readily than the other three and its ionization constant is in the range of a weak acid. The total volume of a standard sodium hydroxide solution used at the first inflection point (pH≅5) in a titration curve is three-fourths of the corresponding volume used at the second inflection point (pH≅9). Both neutral and acid salts of $$(B_{20}H_{18-n}X_n)^{-4}$$

anions can, therefore, be obtained by controlled neutralization of the acid. To illustrate, an aqueous solution of $H_4B_{20}H_{18}$ is titrated with an aqueous solution of CsOH until three of the hydrogen ions are neutralized, as shown by a titration curve. An aliquot portion of the solution is removed at this point and it is evapoarted to dryness to obtain a hydrate of the acid salt $Cs_3HB_{20}H_{18}$, which can also be written conveniently as the hydrate of $Cs_3B_{20}H_{19}$. The remaining portion of the solution can be titrated with an aqueous solution of a second base, if desired, e.g., $(CH_3)_4NOH$, to neutralize the fourth acidic hydrogen. The solution can be evaporated to dryness to obtain, as a hydrate, a salt of the formula $Cs_3(CH_3)_4NB_{20}H_{18}$.

Example 11 illustrates the preparation of the acid, $H_4B_{20}H_{17}OH$, and its conversion to acid and neutral salts by simple metathetic reactions. Neutralization of the acids of eicosaborates is a generic and versatile means of obtaining a broad range of salts. Table 2 illustrates representative salts which can be obtained from a typical acid of the invention, i.e., $H_4B_{20}H_{18}$ by reaction with the base or salt shown in the left column. Other acids of the invention bearing the generic anion of Formula 1 can be used with the base or salt reactant of Table 2 to obtain the corresponding salts.

TABLE 2.—SALTS FROM $H_4B_{20}H_{18}$

| Base or salt reactant | Polyborate salt |
|---|---|
| LiOH | $Li_4B_{20}H_{18}$ |
|  | $Li_3B_{20}H_{19}$ |
| RbOH | $Rb_4B_{20}H_{18}$ |
|  | $Rb_3B_{20}H_{19}$ |
| MgO | $[Mg(H_2O)_6]_2B_{20}H_{18}$ |
|  | $[Mg(H_2O)_6]_3(B_{20}H_{19})_2$ |
| $CaCO_3$ | $Ca_2B_{20}H_{18}$ |
|  | $Ca_3(B_{20}H_{19})_2$ |
| $LaCl_3$ | $[La(H_2O)_6]_4(B_{20}H_{18})_3$ |
|  | $La(H_2O)_6B_{20}H_{19}$ |
| $MnCl_2$ | $[Mn(H_2O)_6]_2B_{20}H_{18}$ |
|  | $[Mn(H_2O)_6]_3(B_{20}H_{19})_2$ |
| $CoCl_2$ | $[Co(H_2O)_6]_3(B_{20}H_{18})_2$ |
| $CuCl_2$ | $[Cu(H_2O)_6]_2B_{20}H_{18}$ |
| $HgCl_2$ | $Hg_2B_{20}H_{18}$ |
| TlOH | $Tl_4B_{20}H_{18}$ |
|  | $Tl_3B_{20}H_{19}$ |
| $PbBr_2$ | $Pb_2B_{20}H_{18}$ |
| Pyridine | $(Pyridinium)_4B_{20}H_{18}$ |
|  | $(Pyridinium)_3B_{20}H_{19}$ |
| Dipyridyl | $[(C_5H_4N)_2H]_3B_{20}H_{19}$ |
| $C_{18}H_{37}NH_2$ | $[C_{18}H_{37}NH_3]_3B_{20}H_{19}$ |

TABLE 2—Continued

| Base or salt reactant | Polyborate salt |
|---|---|
| Piperazine | 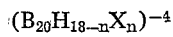 |
| Morpholine |  |
| $C_{10}H_7NH_2$ | $(C_{10}H_7NH_3)_4B_{20}H_{18}$ |
| $Zn(NH_3)_4Cl_2$ | $[Zn(NH_3)_4]_3(B_{20}H_{19})_2$ |
| $[Cr(NH_3)_6Cl]Cl_2$ | $[Cr(NH_3)_6Cl]B_{20}H_{19}$ |
| $[Co(NH_3)_5H_2O]Cl_3$ | $[Co(NH_3)_5H_2O]_4(B_{20}H_{18})_3$ |
|  | $[Co(NH_3)_5H_2O]_3B_{20}H_{19}$ |
| $[Cu(NH_3)_4]SO_4 \cdot H_2O$ | $[Cu(NH_3)_4]_2B_{20}H_{18}$ |
|  | $[Cu(NH_3)_4]_3(B_{20}H_{19})_2$ |
| $(C_4H_9)_3SCl$ | $[(C_4H_9)_3S]_4B_{20}H_{18}$ |
| $(C_2H_5)_4PBr$ | $[(C_2H_5)_4P]_3B_{20}H_{19}$ |
| $[(CH_3)_3PC_2H_4P(CH_3)_3]Br_2$ | $[(CH_3)_3PC_2H_4P(CH_3)_3]_2B_{20}H_{18}$ |
| $C_6H_5NH_2$ | $(C_6H_5NH_3)_3B_{20}H_{19}$ |
| $[(CH_3)_2NNH_3]Cl$ | $[(CH_3)_2NNH_3]_4B_{20}H_{18}$ |
| $CH_3NHNHCH_3$ | $(CH_3NHNH_2CH_3)_3B_{20}H_{19}$ |
| $C_6H_5NHNH_2$ | $(C_6H_5NHNH_3)_3B_{20}H_{19}$ |
| $(C_4H_9)_4NOH$ | $[(C_4H_9)_4N]_4B_{20}H_{18}$ |
| $H_2N(C_2H_4NH_2)_2C_2H_4NH_2$ | $[NH_3(C_2H_4NH_2)_2C_2H_4NH_3]B_{20}H_{18}$ |
| $HOC_2H_4NH_2$ | $(HOC_2H_4NH_3)_4B_{20}H_{18}$ |
|  | $(HOC_2H_4NH_3)_3B_{20}H_{19}$ |
| $ClC_2H_4NH_2$ | $(ClC_2H_4NH_3)_4B_{20}H_{18}$ |
|  | $(ClC_2H_4NH_3)_3B_{20}H_{19}$ |
| $NH_2(CH_2)_5COOH$ | $[NH_3(CH_2)_5COOH]_3B_{20}H_{19}$ |
| $NH_2C_6H_4COOH$ | $(HOOCC_6H_4NH_3)_4B_{20}H_{18}$ |
|  | $(HOOCC_6H_4NH_3)_3B_{20}H_{19}$ |
| Guanidine | $(Guanidinium)_4B_{20}H_{18}$ |
|  | $(Guanidinium)_3B_{20}H_{19}$ |
| $H_2N(CH_2)_6NH_2$ | $[H_3N(CH_2)_6NH_3]_2B_{20}H_{18}$ |

The acids $H_4B_{20}H_{17}OH$, $H_4B_{20}H_{17}NH_2$, and $$H_4B_{20}H_{17}OR$$

where R is defined as in Formula 1, can be employed in place of $H_4B_{20}H_{18}$ in Table 2 to obtain the salts of the corresponding anions.

Metathetic reactions other than neutralization of the acids can be employed to obtain the compounds of the invention, as illustrated in Examples 1–10. To illustrate further, $(CH_3)_3SI$ can be reacted with $Na_4B_{20}H_{18}$ to obtain $[(CH_3)_3S]_4B_{20}H_{18}$; $MgCl_2$ can be reacted with $K_4B_{20}H_{18}$ to obtain $[Mg(H_2O)_6]_2B_{20}H_{18}$; $(C_6H_5)_3CH_3PI$ can be reacted with $(NH_4)_4B_{20}H_{18}$ to obtain $$[(C_6H_5)_3CH_3P]_4B_{20}H_{18}$$

$[(CH_3)_3PCH_2CH_2P(CH_3)_3]I_2$ can be reacted with $Na_4B_{20}H_{18}$ to obtain $[(CH_3)_3PCH_2CH_2P(CH_3)_3]_2B_{20}H_{18}$; ammoniacal $ZnCl_2$ can be reacted with $Cs_4B_{20}H_{17}OH$ to obtain $[Zn(NH_3)_4]_2B_{20}H_{17}OH$ and the like.

Tetravalent eicosaborate anions of the formula $(B_{20}H_{18-n}X_n)^{-4}$ form neutral and acid salts with naturally occurring nitrogen bases, e.g., lysine, aspartic acid, cysteine, asparagine, and the like. The acids of anions of the formula $(B_{20}H_{18-n}X_n)^{-4}$ form neutral and acid salts with polymeric compositions containing basic nitrogen groups, e.g., poly(ethyleneimine), poly(p-aminostyrene), and the like.

UTILITY

The invention provides a broad class of new boron compounds which find applications in many fields.

The compounds of the invention are generically useful as impregnating agents in the preparation of resistors. To illustrate, a section of a cotton string is immersed in a nearly saturated aqueous solution of $Cs_4B_{20}H_{17}OH$. The string is withdrawn from the solution and the solvent is removed by drying in air. A free flame is applied to the dried impregnated string and it burns to yield a coherent ash which in size and shape resembles the original string. The residual skeleton is of sufficient coherence to permit embedding in paraffin. The section of residue, so treated, shows a resistance of about 3000 ohms/cm. The residue from a control section of string is very small and shapeless and it cannot be handled. Residues showing a high resistance can be obtained from other compounds of the invention, e.g., $[(CH_3)_4N]_4B_{20}H_{18}$, $(NH_4)_4B_{20}H_{18}$, $Na_4B_{20}H_{18}$, and $K_4B_{20}H_{18}$.

The hydrazine salts and their solutions in a hydrazine are useful as propellants in rocket propulsion motors. They can be used alone or in combination with oxidizing agents, e.g., nitric acid, fluorine oxide, and the like. To illustrate, combinations can be employed which include $(NH_2NH_3)_4B_{20}H_{18}$ in hydrazine or in N,N-dimethylhydrazine, $(NH_2NH_3)_3B_{20}H_{19}$ in hydrazine, and the like. In compositions as described above, the eicosaborate salt can be present in from about 5–50% by weight of the solutions.

All of the salts which fall within the scope of Formula 1 can be used to prepare the group of acids represented generically as $H_4B_{20}H_{18-n}X_n$ or, in aqueous solution, as $(H_3O)_4B_{20}H_{18-n}X_n$ by passing aqueous or alcoholic solutions of the salts through an acidic ion-exchange resin as described earlier. The acids of this group are strong acids and they are generically useful in industrial applications where it is desired to avoid contamination from sulfate, chloride, bromide, chlorate, phosphate, and like strong acid anions. Thus, the acids are useful for etching metals, such as steel, and for rust removal, for pickling, for scale removal and for similar metal processing operations.

The acids, described above, are generically useful as catalysts in the preparation of esters, e.g., in the reaction of alcohols and organic carboxylic acids, to improve the yields of the desired esters. The acids of the invention are employed for this purpose in the same manner as p-toluenesulfonic acid, sulfuric acid or alcoholic hydrogen chloride.

Aqueous solutions of the acids are generically useful as agents for absorbing noxious basic materials from the air, e.g., traces of ammonia, lower alkyl amines, and the like. To illustrate, air contaminated with methylamines can be passed through an aqueous solution of $H_4B_{20}H_{18}$ and the amines are removed.

All of the compounds of the invention are generically useful as components of fireworks compositions to impart a pleasing color and sparkle to the display, e.g., $(NH_4)_4B_{20}H_{18}$, $(NH_4)_3B_{20}H_{19}$, $Cs_4B_{20}B_{18}$, and like salts, such as the strontium, magnesium and cobalt salts, can be used in such compositions. Each compound within the scope of Formula 1 contains an anion which has boron as a common component. The presence of this element imparts a green color to a fireworks, rocket or flare display. The compounds of the invention can have a wide range of cations, designated as M, and it is thus possible to provide a broad range of colors in any display or flare by choice of the appropriate cation. The compounds of the invention can be used in combination with oxidizing agents, e.g., lithium perchlorate, sodium nitrate, potassium permanganate, strontium peroxide, manganese dioxide, and the like, to provide the desired propulsive effect and color. The folloing combinations in which the boron-containing compounds of the invention can be from 5–25% by weight of the composition are illustrative of the compounds which can be used:

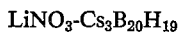
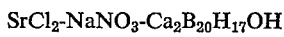
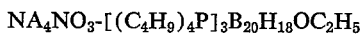

$NaNO_3$-$(NH_4)_4B_{20}H_{18}$ $LiNO_3$-$Cs_3B_{20}H_{19}$ $SrCl_2$-$NaNO_3$-$Ca_2B_{20}H_{17}OH$ $LiClO_4$-$Mg_2B_{20}H_{17}OCH_3$ $NA_4NO_3$-$[(C_4H_9)_4P]_3B_{20}H_{18}OC_2H_5$ $SrNO_3$-$[(CH_3)_2NHNH_3]_4B_{20}H_{17}OH$ and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the class consisting of $H_4B_{20}H_{18-n}X_n$ and salts thereof, wherein X is bonded to boron and is of the class consisting of hydroxyl, aliphatically saturated hydrocarbyloxy, and amino; and $n$ is a cardinal number of 0 to 1, inclusive.

2. A compound of the formula $M_a(B_{20}H_{18-n}X_n)_b$ wherein M is a cation; X is of the class consisting of hydroxyl, aliphatically saturated hydrocarbyloxy of up to 12 carbon atoms, and amino; $n$ is a cardinal number of 0 to 1, inclusive; and $a$ and $b$ are the smallest whole numbers satisfying the equation $$b = \frac{ax \text{ valence of M}}{4}$$

3. A compound of claim 2 wherein M is hydrogen, $a$ is 4 and $b$ is 1.

4. A compound of claim 3 in hydrated form.

5. A compound of the formula $M_{a'}(HB_{20}H_{18-n}X_n)_{b'}$ wherein M is a cation; X is bonded to boron and is of the class consisting of hydroxy, aliphatically saturated hydrocarbyloxy of up to 12 carbon atoms, and amino; $n$ is a cardinal number of 0 to 1, inclusive; and $a'$ and $b'$ are the smallest whole numbers satisfying the equation $$b' = \frac{a'x \text{ valence of M}}{3}$$

6. A compound of the formula $M_a(B_{20}H_{18})_b$ wherein M is a cation, and $a$ and $b$ are the smallest whole numbers satisfying the equation $$b = \frac{ax \text{ valence of M}}{4}$$

7. A compound of claim 6 wherein M is hydrogen, $a$ is 4, and $b$ is 1.

8. A compound of claim 7 in hydrated form.

9. A compound of the formula $M_{a'}(HB_{20}H_{18})_{b'}$ wherein M is a cation, and $a'$ and $b'$ are the smallest whole numbers satisfying the equation $$b' = \frac{a'x \text{ valence of M}}{3}$$

10. $(NH_4)_4B_{20}H_{18}$.
11. $(NH_4)_3HB_{20}H_{18}$.
12. $Cs_4B_{20}H_{18}$.
13. $[(CH_3)_4N]_4B_{20}H_{18}$.
14. $[(CH_3)_4N]_3HB_{20}H_{18}$.

15. A process for preparing a compound of the formula $M_{a'}(HB_{20}H_{18})_{b'}$ wherein M is a cation, and $a'$ and $b'$ are the samllest whole numbers satisfying the equation $$b' = \frac{a'x \text{ valence of M}}{3}$$

which comprises reacting a compound of the formula $M_{a''}(B_{10}H_{10})_{b''}$ wherein M is defined as above, and $a''$ and $b''$ are the smallest whole numbers satisfying the equation $$b'' = \frac{a''x \text{ valence of M}}{2}$$

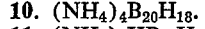
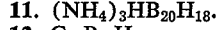
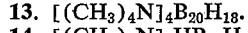
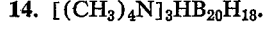

with an oxidizing agent containing a variable valence metal in its highest valence state, said oxidizing agent having an oxidation-reduction potential in acid solution of about −1.33 to about −1.61 volts, in a hydroxylated solvent at a temperature below 20° C.

16. In a process for preparing a compound of the formula $M_a(B_{20}H_{18})_b$ wherein M is a cation and $a$ and $b$ are the smallest whole numbers satisfying the equation $$b = \frac{ax \text{ valence of M}}{4}$$

the step which comprises treating a compound of the formula $H_2(B_{20}H_{18})_2$ in an aqueous medium with a metal having a standard electrode potential at 25° C. of at least about 0.75 volts.

(References on following page)

References Cited

UNITED STATES PATENTS 3,148,939  9/1964  Knoth _____ 23—361

OTHER REFERENCES

Adams, Roy M.: Metallo-Boron Compound and Boranes, p. 487, Interscience Publishers, N.Y. 1964.

Hawthorne et al. (I), Journal of the American Chemical Society, vol. 85, p. 3704 (Nov. 20, 1963), Copy in Sci. Lib.

Hawthorne et al. (II), Journal of the American Chemical Society, vol. 85, pp. 3704–3705 (Nov. 20, 1963), Copy in Sci. Lib.

Kaczmarczyk et al., "Proceedings of the National Academy of Sciences, U.S.," vol. 48, pp. 729–733 (May, 1962), Copy in 23/361 in Group 110.

Pitochelli et al., Journal of the American Chemical Society, vol. 84, pp. 3026–3027 (Aug. 5, 1962), Copy in Sci. Lib.

E. C. THOMAS, *Primary Examiner.*

C. O. PETERS, *Assistant Examiner.*

U.S. Cl. X.R.

23—361; 260—606.5

PO-1050
(5/69)

UNITED STATES PATENT OFFICE
CERTIFICATE OF CORRECTION

Patent No. 3,446,604          Dated May 27, 1969

Inventor(s) Earl L. Muetterties

It is certified that error appears in the above-identified patent and that said Letters Patent are hereby corrected as shown below:

Col. 2, lines 26, 50 and 71, "x" in the formulae should be the mathematical symbol for times;

Col. 3, line 11, "x" in the formula should be the mathematical symbol for times;

Col. 21, line 54, the spelling of -- following -- should be corrected; line 62, the formula should read
-- $NH_4NO_3-[(C_4H_9)_4P]_3B_{20}H_{18}OC_2H_5$ --;

Col. 22, Claims 2, 5, 6, 9, 15 (twice) and 16, "x" should be the mathematical symbol for times; and Claim 15, correct the spelling of -- smallest --.

Signed and sealed this 20th day of March 1973.

(SEAL)
Attest:

EDWARD M. FLETCHER, JR.
Attesting Officer

ROBERT GOTTSCHALK
Commissioner of Patents